United States Patent [19]
Carlsson et al.

[11] Patent Number: 5,668,418
[45] Date of Patent: Sep. 16, 1997

[54] THREE-PHASE FILTER EQUIPMENT INCLUDING STANDBY FILTER BRANCH FOR SWITCHABLY REPLACING A REMOVED FILTER BRANCH FOR A PARTICULAR PHASE

[75] Inventors: Lennart Carlsson; Tommy Holmgren, both of Ludvika, Sweden

[73] Assignee: Asea Brown Boveri AB, Västerås, Sweden

[21] Appl. No.: 547,229

[22] Filed: Oct. 24, 1995

[30] Foreign Application Priority Data

Oct. 25, 1994 [SE] Sweden .................. 9403649

[51] Int. Cl.[6] .................................................. H02J 1/02
[52] U.S. Cl. .................. 307/105; 333/175; 361/113
[58] Field of Search .................... 307/105, 112, 307/116, 125, 82–87; 323/205–209; 363/39; 336/5; 361/59, 61, 113; 333/167, 171, 172, 174–176, 180; 327/532, 552, 553; 318/629

[56] References Cited

U.S. PATENT DOCUMENTS

| 3,711,760 | 1/1973 | Kaiser ............................. 336/5 |
| 4,429,338 | 1/1984 | Becker et al. .................. 361/113 |
| 4,622,474 | 11/1986 | Christl et al. ................. 307/105 |

FOREIGN PATENT DOCUMENTS

WO94/11891  5/1994  WIPO .

OTHER PUBLICATIONS

Adamson et al., High Voltage Direct Current Power Transmission, pp. 167–171, Garraway Ltd. First Edition 1960.

Adamson et al., High Voltage Direct Current Convertors and Systems, pp. 146–163, McDonald & Company (Publishers) Ltd. 1965.

Uhlmann, Power Transmission by Direct Current, pp. 361–379, Springer-Verlag Berlin Heidelberg New York 1975.

Ekstrom, High Power Electronics HVDC and SVC, EKC Electric Power Research Center, The Royal Institute of Technology Stockholm, pp. 6–1 to 6–33, Jun. 1990.

Primary Examiner—Richard T. Elms
Attorney, Agent, or Firm—Pollock, Vande Sande & Priddy

[57] ABSTRACT

Filter equipment is adapted for connection to an ac power network (N) for damping of current harmonics originating from an installation (TR, SR1, SR2), connected to the network, for power transmission by means of high-voltage direct current. The equipment has a three-phase filter set (F) with three filter branches which are each normally connected to a separate phase of the network via first switching members (BO). A spare filter branch (FR) is arranged as a stand-by for the three filter branches of the filter set (F) and is adapted for connection to an optional phase of the network by means of second switching members (BR).

10 Claims, 4 Drawing Sheets

THREE-PHASE FILTER EQUIPMENT INCLUDING STANDBY FILTER BRANCH FOR SWITCHABLY REPLACING A REMOVED FILTER BRANCH FOR A PARTICULAR PHASE

TECHNICAL FIELD

The present invention relates to three-phase filter equipment for connection to a three-phase ac power network and adapted for damping current harmonics which originate from an installation, connected to the network, for power transmission by means of high-voltage direct current. The equipment comprises a three-phase filter set with three mutually substantially identical ordinary filter branches, each being adapted for connection to a separate phase of the network via first switching members. Further, the equipment comprises spare filter members adapted for connection to the network via second switching members.

BACKGROUND ART

From, for example,
Adamson, Hingorani: "High Voltage Direct Current Power Transmission", London 1960, pp 167–171,
Adamson et al: "High Voltage Direct Current Convertors & Systems", London 1965, pp 147–162,
Uhlmann: "Power Transmission by Direct Current", Berlin-Heidelberg-New York 1975, hereinafter referred to as "Uhlmann", pp 361–379, and
Åke Ekström: "High Power Electronics, HVDC and SVC, Stockholm 1990, pp 1–21 and 6-1–6-33,
it is previously well known
  to use converters, connected to an ac power network, for power transmission by means of high-voltage direct current (HVDC),
  that a converter of the type which is generally used in such contexts generates current harmonics in that ac power network to which it is connected,
  that these current harmonics tend to generate interference, for example in lines for telecommunication or other signalling lines, and
  to connect filter equipment to the ac network to reduce the amplitude of the current harmonics and hence their disturbing influence.

A converter of the kind referred to generates on its ac side current harmonics with the ordinal numbers m and the frequencies $$f_n = m \cdot f_0$$

where
  $m = n \cdot p \pm 1$
  $n = 1, 2, 3, \ldots$
  p is the pulse number of the converter
  $f_0$ is the fundamental frequency of the ac power network (usually 50 or 60 Hz).

Usually there are used in these applications converters with the pulse number 12, and such a converter generates harmonics with the ordinal numbers 11, 13, 23, 25, 35, 37, etc. The amplitude of the harmonics is, in a known manner, highest for the harmonics with the lowest ordinal numbers and decreases rapidly with increasing ordinal number.

Filter equipment previously known for damping of the above-mentioned harmonics consists of one or more three-phase filters connected to the ac network. Such a filter consists of three single-phase circuits, which are each arranged for connection between ground and a separate phase of the ac network (connection of the phase circuits between the phases of the network has also been proposed). A three-phase filter of this hitherto used type has, from an electrical and physical point of view, constituted one single unit. The filter with its three phase circuits has thus been connected to and disconnected from the network as one single unit. Likewise, the three phase circuits of the filter have been erected within a common enclosure.

For the harmonics with the lowest ordinal numbers, tuned filters are usually arranged, wherein each filter is tuned to a certain harmonic and has resonance, that is, an impedance minimum, at the frequency of this harmonic. Also double-tuned filters are used, that is, filters with impedance minima at two frequencies, and then usually at the frequencies of two adjacent harmonics, for example those with the ordinal numbers 11 and 13. Further, at harmonics with higher ordinal numbers, single-tuned filters are sometimes used for damping two adjacent harmonics, for example the harmonics with the ordinal numbers 23 and 25, the resonance frequency of the filter then being placed between the frequencies of the harmonics, in the latter example, for example, at the frequency $24 \cdot f_0$, and the bandwitdh of the filter being made so large that sufficient damping is obtained of the two harmonics under discussion. Such a filter is often designed with high-pass characteristic for filtering of the harmonics with the higher ordinal numbers.

The resonance frequency of a tuned filter of the kind described in the above-mentioned publications will exhibit variations, which are not negligible and which are primarily caused by the changes in capacity exhibited by the capacitances of the filter capacitors at the temperature variations to which filter equipment is subjected. The variations of the frequency of the ac network, which always occur, have the same influence. To obtain sufficient harmonic damping under all operating conditions, the filters must therefore be designed with a larger bandwitdh, that is, a lower quality factor, than what would otherwise have been necessary. To obtain a sufficiently low impedance of the filters despite this fact, it has been necessary to give them large dimensions.

The fact that the filters—which at the fundamental frequency of the network are capacitive—are to a certain extent dimensioned to contribute to the need of reactive power by the converter and possibly the network has also contributed to the large dimensions.

For the above reasons, in HVDC installations known so far, the pieces of filter equipment on the ac side have been given very large dimensions and they account for a considerable part of the total costs of an HVDC installation.

In certain cases, the filters have such large dimensions that they cannot be connected into the network or be disconnected from the network without too large voltage jumps occurring because of the connection and disconnection, respectively, of the reactive-power generating capacitors of the filters. The filters have then been divided into two or more three-phase sub-filters, which may be connected and disconnected, respectively, individually.

The strong requirement for sufficient damping of the current harmonics under all operating conditions has resulted in the necessity of rapidly disconnecting a filter (or possibly the whole filter equipment), when a fault occurs therein, and in the necessity of connecting a spare filter (or complete stand-by filter equipment). As in the case of the ordinary filter equipment, the costs and the space requirement for these spare filters are high. If the filters in the ordinary filter equipment are not divided into sub-filters, each spare filter will have the same dimensions as the ordinary filter, and the increase in cost caused by the requirement for spare filters becomes 100% of the cost of the ordinary filter. If, in the manner described above, a certain filter is divided into several mutually identical sub-filters, however, it is sufficient to arrange one single such sub-filter as a stand-by, whereby the increase in cost will be lower. Under all circumstances, however, the costs of spare filters have made up a considerable part of the total cost of a HVDC installation.

From Uhlmann, p 373, it is known that tuned filters for HVDC installations may be designed with a variable tuning by making the inductance of an inductor included in a filter mechanically controllable. This may be made automatically in that control equipment suitably senses if the resonance frequency of the filter corresponds to the frequency of the harmonic in question and varies the inductance such that correct tuning always prevails, independently of variations of the reactance values of the filter components and independently of variations of the line frequency. Alternatively, in such a filter the inductance may be controlled electromagnetically in the manner described in the international patent application PCT/SE/00946 with publication number WO 94/11891. A filter with automatic tuning may be designed with a higher factor of merit, that is, with a lower impedance, than a non-controllable filter. It will therefor have smaller dimensions and generates lower reactive power than a non-controllable filter. For this reason, it is normally not required that such a filter be divided into individually switchable three-phase sub-filters. This, however, means that a spare filter becomes as large as the ordinary filter, that is, entails an increase in cost of 100°.

SUMMARY OF THE INVENTION

The object of the invention is to provide filter equipment of the kind described in the introduction, in which—while at the same time ensuring the interruption-free operation of the filter equipment—the amount of components, the costs, and the space requirement of the spare filter members can be considerably reduced in comparison with prior art equipment.

What characterizes a method and a device according to the invention will become clear from the appended claims.

BRIEF DESCRIPTION OF THE DRAWINGS

The invention will be explained in greater detail in the following with reference to the accompanying FIGS. 1–4, wherein.

DESCRIPTION OF THE PREFERRED EMBODIMENTS

Figure 1:
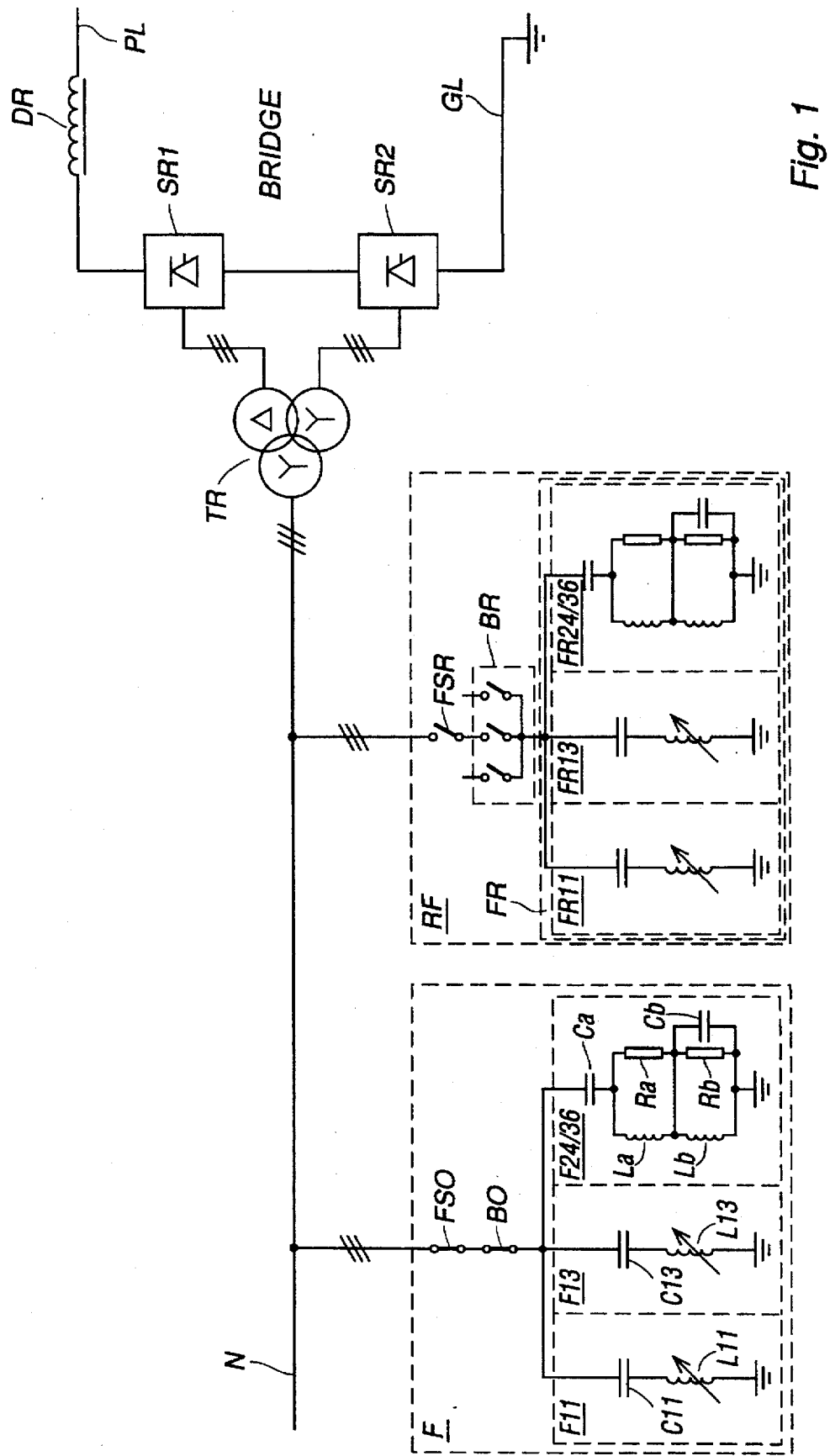
FIG. 1 shows the principle of an embodiment of filter equipment according to the invention.

FIG. 1 shows, substantially in the form of a single-line diagram, a three-phase ac network N, to which an installation for power transmission by means of high-voltage direct current (HVDC) is connected, as well as filter equipment F, RF for damping current harmonics generated by the converters.

The HVDC installation is only schematically shown and has a 12-pulse converter connection consisting of two direct-voltage series-connected 6-pulse bridges SR1 and SR2. One pole of the converter connection is connected to ground via a ground line GL, and the other pole is connected via a smoothing reactor DR to a dc line PL. The converter bridges are connected to the network N via a common converter transformer TR with a star-connected network winding and two converter windings, one of which being star-connected and the other delta-connected.

A filter set F for damping current harmonics is connected to the network via disconnectors FSO and circuit breakers BO. The filter set consists of three mutually identical single-phase filter branches, each for connection to a separate one of the three phases of the network. Each filter branch comprises three filter units F11, F13 and F24/36. The filter units F11 are tuned to the current harmonic with the ordinal number 11 and the filter units F13 to the thirteenth tone. The filter unit F24/36 is a double-tuned filter unit with impedance minima at the 24th and 36th tones and with such a bandwidth that damping is obtained of the tones with the ordinal numbers 23, 25, 35 and 37. In addition, the filter unit has the character of a high-pass filter, whereby damping is obtained of tones with a higher ordinal number than those just mentioned.

Each one of the filter units F11 has the composition shown in the figure with a capacitor C11 in series with an inductor L11 with a controllable inductance.

In the same way, each one of the filter units F13 comprises a capacitor C13 in series with an inductor L13 with a controllable inductance.

In the manner shown above, each one of the filter units F24/36 comprises a capacitor Ca in series with two inductors La and Lb, each one being connected in parallel with a resistor, Ra and Rb, respectively. In parallel with the inductor Lb and the resistor Rb, a capacitor Cb is arranged, which gives the circuit a high-pass character.

The circuit breakers BO consist of three individually operable single-phase circuit breakers, for example conventional electromechanical high-voltage circuit breakers.

During normal operation, the disconnector FSO and the circuit breakers BO are closed in the manner shown in the figure.

A spare filter circuit RF is arranged as stand-by for the filter equipment F. The spare filter consists of one single filter branch FR with the three filter units FR11, FR13 and FR24/36. The filter unit FR11 is built up in the same way as one of the three filter units F11 of the filter set F and is tuned to the 11th tone. The filter unit FR13 is built up in the same way as one of the three filter units F13 of the filter set F and is tuned to the 13th tone. The filter unit FR24/36 is built up in the same way as one of the three filter units F24/36 of the filter set F and thus tuned to the tones with the ordinal numbers 24 and 36, and the unit has, in addition, high-pass characteristic for higher frequencies.

The three filter units of the filter branch FR are permanently connected to each other and are connected to the three single-phase and individually operable circuit breakers BRA, BRB and BRC, which together constitute the switching member BR and which, in turn, via the disconnectors FSR, are each connected to one of the three phases of the network N. Also these circuit breakers may consist of conventional electromechanical high-voltage circuit breakers.

Figure 2:
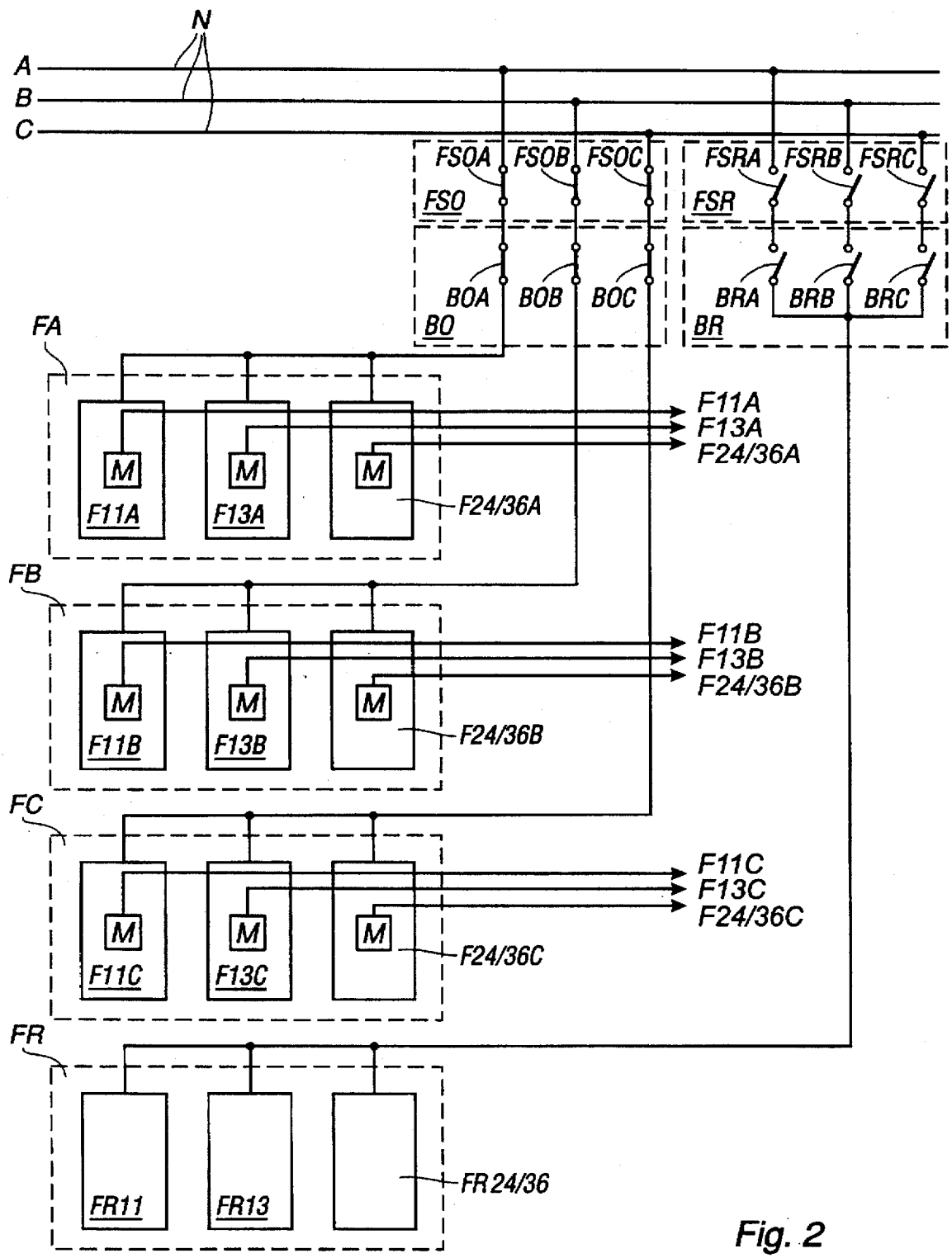
FIG. 2 shows in more detail how the filter units and switching members of the ordinary filter set and the spare filter branch are arranged.

FIG. 2 shows in more detail how the filter units and switching members of the filter set F and the filter branch FR are interconnected and connected to the three phase conductors A, B and C of the network.

The filter set F is shown with its three filter branches FA, FB and FC. The filter branch FA has the filter units F11A, F13A and F24/36A. The filter branch FB has the filter units F11B, F13B and F24/36B. The filter branch FC has the filter units F11C, F13C and F24/36C. The filter units F11A, F13A, F24/36A associated with the filter branch FA are connected, in parallel with each other, to the circuit breaker BOA and are connected via the normally closed circuit breaker and the corresponding disconnector FSOA to the phase conductor A. The filter units F11B, F13B, F24/36B associated with the filter branch FB are connected, in parallel with each other, to the circuit breaker BOB and are connected, through the normally closed circuit breaker and the corresponding disconnector FSOB, to the phase conductor B. The filter units F11C, F13C, F24/36C associated with the filter branch FC are connected, in parallel with each other, to the circuit breaker BOC and are connected, through the normally closed circuit breaker and the corresponding disconnector FSOC, to the phase conductor C.

The filter branch FR is built up of the filter units FR11, FR13 and FR24/36. These filter units are interconnected and connected to the circuit breakers BRA, BRB and BRC, which in turn, via the disconnectors FSRA, FSRB and FSRC, are each connected to one of the three phase conductors A, B, C of the network N. The circuit breakers are normally open, that is, the filter units of the spare filter are not normally connected to the network.

The limits of the filter branches are shown in FIG. 2 by dashed lines. In the example shown, the filter branches are arranged on the ground in the manner shown in the figure, and the filter branches are surrounded by fences or the like which physically separate the filter branches from each other and from the surroundings and which serve as efficient semi-enclosure. This makes possible maintenance, fault detection and other operations on a filter branch which is disconnected from the network and thus taken out of operation, with the other filter branches being in operation.

Figure 3:
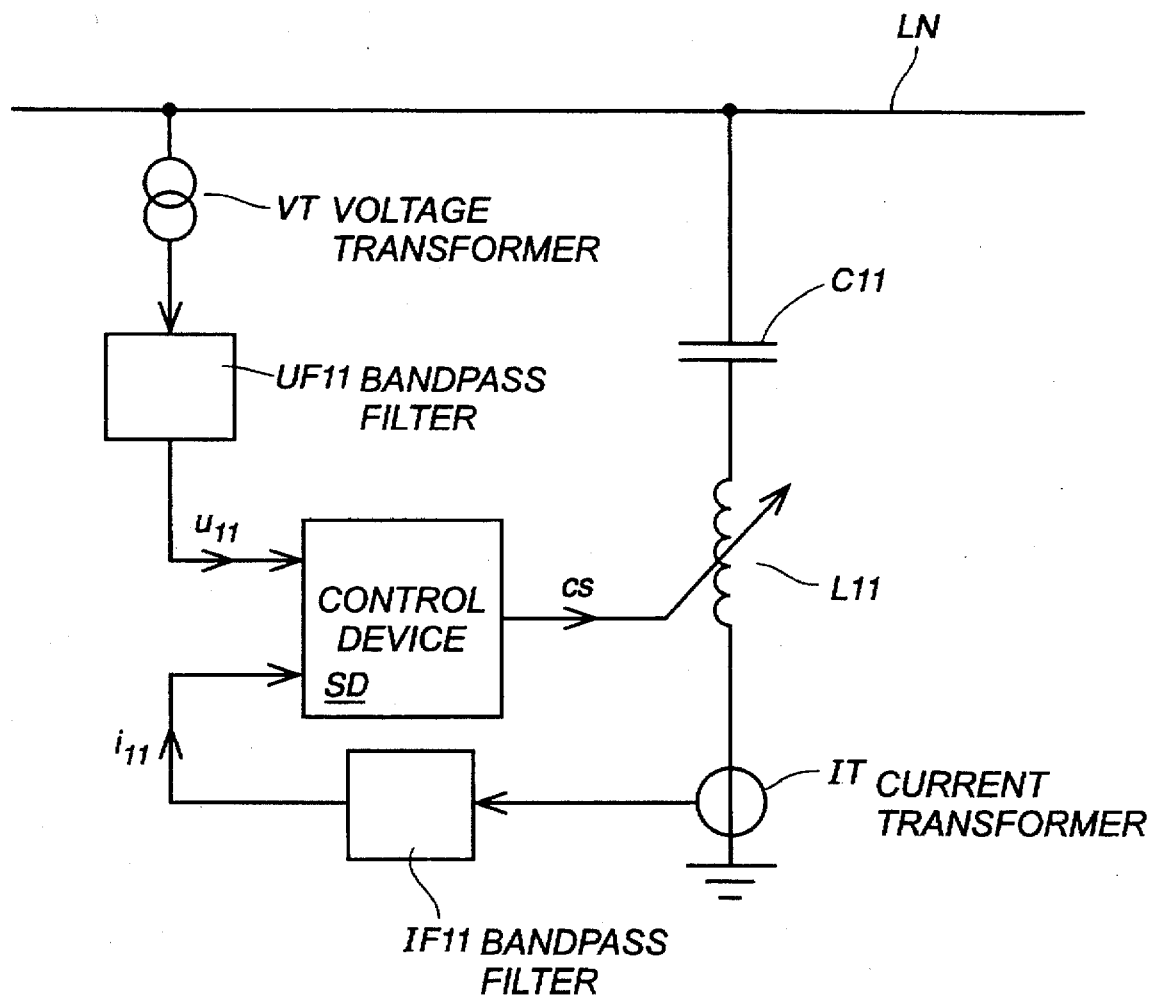
FIG. 3 shows an example of how a filter unit is adapted for automatic tuning.

FIG. 3 shows, in principle, how a filter with an automatically controlled tuning may be arranged. The figure shows as an example the filter unit F11A included in the filter branch FA. The filter unit is connected between ground and the conductor LN which connects the filter branch to the phase conductor A of the network via the circuit breaker BOA. The inductor L11 has a controllable inductance which is varied with the aid of a control signal cs supplied to the inductor. With the aid of a voltage transformer VT and a bandpass filter UF11 tuned to the 11th tone, a signal $u_{11}$ is formed which, with respect to its phase position, corresponds to the harmonic voltage with the ordinal number 11 across the filter. With the aid of a current transformer IT and a bandpass filter IF11 tuned to the 11th tone, a signal $i_{11}$ is obtained which, with respect to its phase position, corresponds to the harmonic current through the filter. A control device SD receives both of these signals, senses the phase difference between them and controls, with the aid of the control signal cs, the inductance of the inductor in dependence on the sensed phase difference such that the filter all the time operates at the resonance frequency where, in principle, the above-mentioned phase difference is zero.

Figure 4:
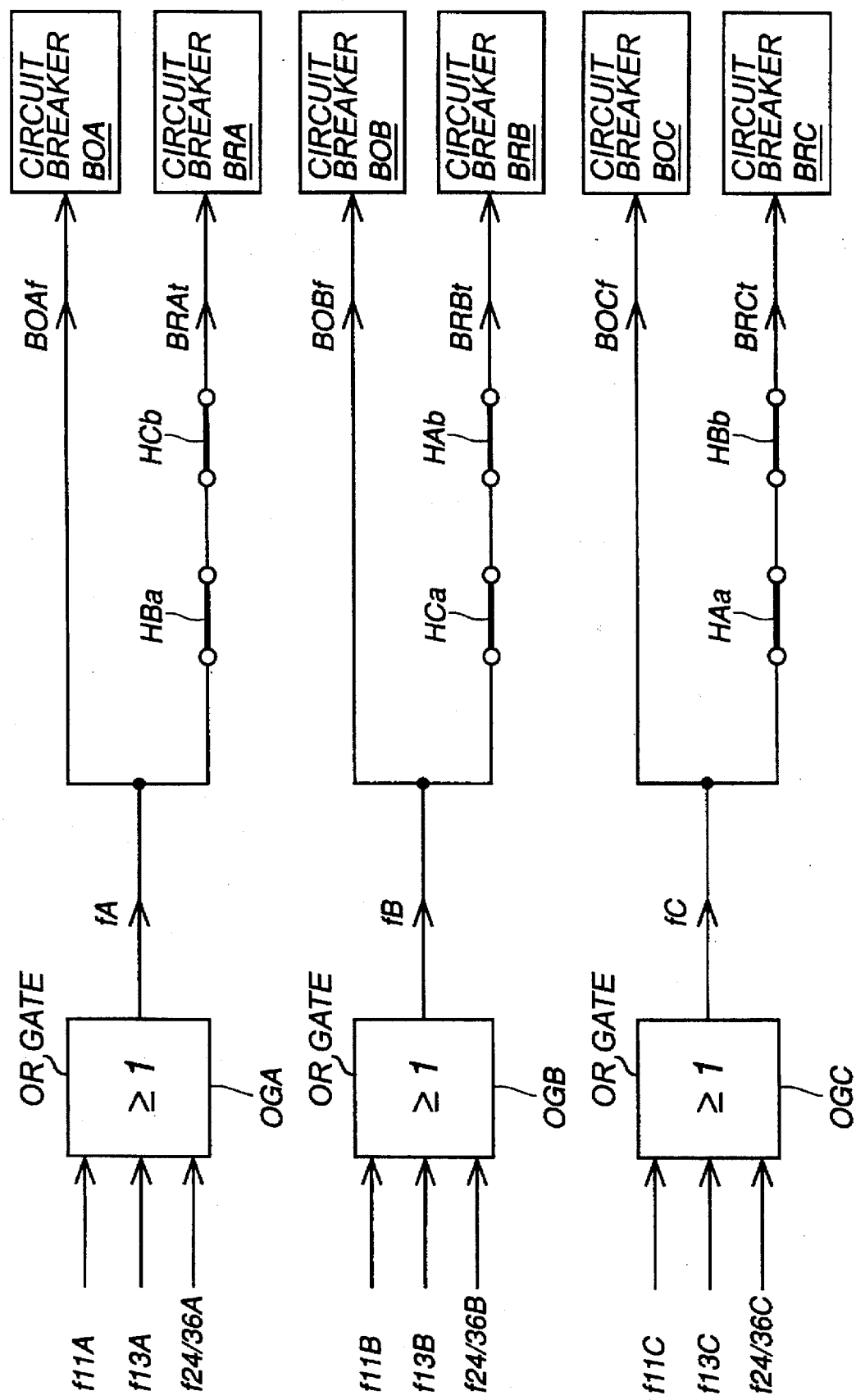
FIG. 4 shows how trip signals from the protective circuits of the filter units are adapted to influence the switching members of the filter equipment in the installation shown in FIGS. 1–2.

The filter units of the filter set F are provided with monitoring and protective circuits M, shown in FIG. 2, for example capacitor protective means of the kind described in Uhlmann, pages 376-379, and overcurrent protective means. In the event of a fault in a phase circuit, a trip signal F11, F13 and F24/36 is obtained from the protective circuits. FIG. 4 shows how these trip signals are adapted to influence the switching members of the filter set. The monitoring and protective systems are also separated, with one separate system per filter branch, such that maintenance and fault detection can be carried out on one phase/filter branch at a time.

A trip signal from, for example, the filter unit F11A is designated f11A, and the corresponding designations are used for the other filter units. The signals f11A, f13A, f24/36A from the filter units associated with the filter branch FA are supplied to an OR circuit OGA, the output signal fA of which is supplied to the circuit breaker BOA associated with the filter branch FA and to the circuit breaker BRA associated with the filter branch FR. The signal fA is supplied to the operating device of the circuit breaker BOA in the form of an opening signal BOAf, which causes opening of the circuit breaker and disconnection of the filter branch FA. The signal fA is further supplied to the operating device of the circuit breaker BRA in the form of a closing signal BRAt, which causes closing of the circuit breaker BRA and connection of the filter branch FR to phase A as replacement for the disconnected filter branch FA. The operation of the filter equipment is hereby maintained unchanged and the switching can be made without any noticeable interruption.

The closing signal fA-BRAt is supplied to the circuit breaker BRA via auxiliary contacts HBa and HCb of the circuit breakers BRB and BRC. These contacts are closed when the corresponding circuit breaker is open, but are opened upon closing of the circuit breaker. These auxiliary contacts constitute an efficient interlock which, if one of the three circuit breakers of the spare filter branch is closed, blocks closing of the other two circuit breakers.

The configuration and the function of the trip circuits for the other two filter branches correspond completely to what has been described for the filter branch FA.

When the spare filter branch FR is connected into a phase (e.g. phase A), the disconnectors (FSRB, FSRC) to the other two phases are suitably opened to prevent the main voltage of the network from lying constantly across the main contacts of the circuit breakers of the other two phases.

As will be clear from the above, in filter equipment according to the invention, the dimensions of, and hence the costs and the space requirement for, the spare filter members which are required to be able to maintain an interruption-free filter function are considerably lower than in prior art filter equipment for HVDC installations. In principle, the dimensions of the spare circuits may be reduced by about two-thirds. Because of the considerable extent of the filter equipment in an HVDC installation, the invention therefore makes possible considerable savings as far as costs and space for such an installation are concerned.

The spare filter branch FR may, of course, be used also on other occasions than those on which a fault in any of the filter units of the filter set F causes disconnection of a filter branch in this filter. For example, during a check-up or revision, a filter branch of the filter set F may be disconnected by a manually initiated operation and be replaced by the filter branch FR.

As switching members for disconnecion of filter branches of the filter set F and connection of the spare filter branch FR, conventional electromechanical high-voltage circuit breakers (supplemented by disconnectors) have been described above. If the requirements for rapid operation may be set lower, as an alternative, three-phase disconnection may be used to select the phase and a single-phase circuit breaker to connect the filter. In this case, for example, before the disconnector operation, the current of the HVDC installation may be reduced to zero and the converters blocked, and after the disconnector operation, converter deblocking and current increase are then performed.

As an alternative to the above-described switching members, other types of switching members may be used, for example thyristor switches.

There has been described above how the desired mutual interlocking of the switching members of the spare filter branch may be achieved by electrical interlocking of the closing signals for the circuit breakers with the aid of the auxiliary contacts of the circuit breakers. Alternatively, interlocking may be achieved in other ways, for example by pure mechanical interlocks.

The filter equipment described above has in each filter branch two single-tuned filter units with automatic tuning and a double-tuned filter unit which also serves as a high-pass filter. This filter design is only one example, and the invention may be applied to arbitrary other types of filter equipment. Such equipment may, for example, have

- a larger or smaller number of filter units per filter branch than in the example described above (where the number is three),
- arbitrary combinations of non-tuned filter units, of filter units with fixed tuning, and of filter units with manually or automatically controllable tuning,
- other embodiments of the filter units of the filter branches than the units described above as examples,
- one or more of the filter units of a filter branch divided into several individually connected sub-filter units.

The invention may also be applied to filter equipment in which the ordinary filter is a so-called active filter, for example of the type described in Wong et al: "Feasibility Study of AC- and DC-side Active Filters for HVDC Converter Terminals", IEEE Transactions on Power Delivery, Vol. 4, No. 4, October 1989, pp 2067–2075.

The invention may be applied in connection with other types of HVDC installations than those described above, for example with other types of converters and with other pulse numbers, and to bipolar HVDC transmissions.

In the embodiment described above, the ordinary filter set has one single filter branch for each phase, that is, three filter branches. Alternatively, for each phase the ordinary filter set may consist of two or more filter branches with separate and individually operated switching members.

These filter branches for a certain phase may be mutually identical and each contain a complete set of filter units. In this case, the spare filter members may consist of one single spare filter branch.

Alternatively, the filter branches for a certain phase may be mutually different and contain filter units with different characteristics, and in an extreme case each filter branch may contain one single filter unit. In these cases, the spare filter members are suitably arranged with a spare filter branch for each type of filter branches in the ordinary filter set.

A spare filter branch may in every respect be exactly identical with the filter branches it is to serve as a stand-by for. Possibly, however, the spare filter branch may, in certain respects, deviate from the ordinary filter branches. If a certain asymmetry with regard to the harmonic damping may be temporarily allowed, the spare filter branch may thus be dimensioned more narrowly and with less good harmonic damping. Likewise, a spare filter branch in equipment where the ordinary filter units of the filter set have automatically controlled tuning, may possibly be designed with fixed tuning or with manually controlled tuning. Likewise, a spare filter branch may possibly be designed with lower load capacity than the ordinary filter branches.

We claim:

1. Three-phase filter equipment for connection to a three-phase ac power network (N) for damping current harmonics generated by an installation, connected to the network, for power transmission by means for generating high-voltage direct current comprising:

a three-phase filter set (F) with three mutually substantially identical filter branches (FA, FB, FC), each of said branches being connected to a separate phase of the network via first switching members (BO), and spare filter members (RF) for connection to the network via second switching member (BR), the spare filter members comprising a spare filter branch (FR) to serve as a stand-by for the three filter branches (FA, FB, FC) of the filter set (F), and said second switching members (BR) connecting the spare filter branch (FR) to an arbitrary phase of the network.

2. Filter equipment according to claim 1, wherein said first switching member (BO) separately connect and disconnect the network and each of the filter branches of the filter set independently of the other filter branches of the filter set.

3. Filter equipment according to claim 2, wherein when disconnecting one of the three filter branches of the filter set by means of said first switching members said second switching members connect a spare filter branch (FR) to that phase of the network to which the disconnected filter branch was connected.

4. Filter equipment according to claim 1, wherein the spare filter branch has substantially the same frequency characteristic as the filter branches of the filter set (F).

5. Filter equipment according to claim 1, in which each one of the filter branches of the filter set comprises filter units which are tuned to a set of current harmonics of the ac network, and the spare filter branch comprises filter units which are tuned to said set of harmonics.

6. Filter equipment according to claim 5, in which each one of the three filter branches of the filter set comprises a filter unit which is provided with means for automatic tuning of the filter unit, and the corresponding filter unit of the spare filter branch (FR) is provided with means (SD, L11) for automatic tuning of the filter unit.

7. Filter equipment according to claim 5, in which each filter branch comprises a plurality of filter units, the filter units connected, in parallel with each other, to said first switching members for common connection and disconnection of the filter units of the filter branch, and the filter units of the spare filter branch are connected in parallel with each other to said second switching members for common connection and disconnection of the filter units of the spare filter branch.

8. Filter equipment according to claim 1, wherein said second switching members are provided with interlocking members to prevent connection of the spare filter branch to more than one of the phases of the network at a time.

9. Filter equipment according to claim 1, wherein the filter branches of the filter set (F) are provided with monitoring means to deliver trip signals for disconnecting the filter branches under abnormal operating conditions, and the trip signals are supplied to said first switching members so that a trip signal from a certain filter branch causes disconnection of the filter branch, and to said second switching member for connection of the spare filter branch to that phase of the network to which the disconnected filter branch was connected.

10. Filter equipment according to claim 1, wherein the filter branches of the filter set (F) are arranged physically separated from each other and from the spare filter branch to make possible work on a disconnected filter branch with the other filter branches of the filter set being in operation.

* * * * *